United States Patent
Wuellrich et al.

(10) Patent No.: US 6,325,446 B1
(45) Date of Patent: Dec. 4, 2001

(54) RETARDATION AND ENERGY STORAGE DEVICE FOR FOLDING-TOP CONVERTIBLES

(75) Inventors: Heinrich Wuellrich, Bogen; Rudolf Steinbrenner, Bischofsmais, both of (DE)

(73) Assignee: Edscha Cabrio-Verdecksysteme GmbH, Hengersberg (DE)

( * ) Notice: Subject to any disclaimer, the term of this patent is extended or adjusted under 35 U.S.C. 154(b) by 0 days.

(21) Appl. No.: 09/627,885

(22) Filed: Jul. 28, 2000

(30) Foreign Application Priority Data

Jul. 31, 1999 (DE) .............................. 199 36 242

(51) Int. Cl.$^7$ ...................................... B60J 7/00

(52) U.S. Cl. ............................. 296/107.12; 296/107.04; 296/107.08; 296/107; 296/219

(58) Field of Search .................... 296/107.12, 107.04, 296/107.08, 107, 108, 219

(56) References Cited

U.S. PATENT DOCUMENTS

| | | | | |
|---|---|---|---|---|
| 3,075,804 | * | 1/1963 | Geiger et al. ..................... | 296/107.12 |
| 4,693,509 | * | 9/1987 | Moy et al. ........................ | 296/107.12 |
| 4,747,635 | * | 5/1988 | Wagner ............................ | 296/107.12 |
| 4,840,419 | * | 6/1989 | Kolb ................................. | 296/108 |
| 5,002,330 | * | 3/1991 | Koppenstein et al. ............ | 296/107 |
| 5,016,939 | * | 5/1991 | Nishikawa et al. ............... | 296/219 |
| 5,106,151 | * | 4/1992 | Nishikawa et al. ............... | 296/219 |
| 5,338,085 | * | 8/1994 | Guckel et al. .................... | 296/121 |
| 5,558,388 | * | 9/1996 | Furst et al. ....................... | 296/107 |
| 5,620,226 | * | 4/1997 | Sautter ............................. | 296/107 |
| 5,918,928 | * | 7/1999 | Kolb et al. ........................ | 296/107.04 |
| 5,921,608 | * | 7/1999 | Schmidt et al. .................. | 296/107.08 |
| 5,998,948 | * | 12/1999 | Lange et al. ..................... | 296/122 |

FOREIGN PATENT DOCUMENTS

| | | | | |
|---|---|---|---|---|
| 000184205 | * | 8/1936 | (CH) ............................... | 296/107.012 |
| 643515 | | 9/1937 | (DE) . | |
| 4121226 | | 5/1992 | (DE) . | |
| 4102119 | | 7/1992 | (DE) ............................... | F16C/1/22 |
| 004210550 | * | 10/1993 | (DE) ............................... | 296/107.12 |
| 19820711 | | 11/1999 | (DE) ............................... | B60J/7/12 |
| 000292654 | * | 11/1988 | (EP) ............................... | 296/107.12 |
| 002207098 | * | 1/1989 | (GB) .............................. | 296/107.12 |
| 002234474 | * | 2/1991 | (GB) .............................. | 296/107.12 |
| 000299565 | * | 11/1936 | (IT) ................................ | 296/107.12 |

* cited by examiner

*Primary Examiner*—Joseph D. Pape
*Assistant Examiner*—Kiran B. Patel
(74) *Attorney, Agent, or Firm*—Davidson, Davidson & Kappel, LLC

(57) ABSTRACT

A folding top for a vehicle having a vehicle body with an x direction and a z direction, the folding top comprising a front top component for resting on a part of the vehicle body when the folding top is in a closed position, another top component, the front top component being pivotable with respect to the other top component, the front top component being pivotable upwardly about a bearing axis when being opened, and a spring energy store of an automatic facility for pivoting the front top component, the spring energy store being stressed as the front top component is pivoted downwardly and released as the front top component is pivoted upwardly, the spring energy store being arranged in an installation space remote from the bearing axis of the front top component. The front top component is connected by a cable to the spring energy store, the cable being connected to the front top component at an attachment location, the spring energy store being fixed in relation to movement of the front top component, the cable being guided over at least one deflection element between the front top component and the spring energy store, the at least one deflection element located nearest to the front top component being arranged behind the front top component in the x direction and above the attachment location in the z direction. Two alternate arrangements are also provided.

17 Claims, 4 Drawing Sheets

RETARDATION AND ENERGY STORAGE DEVICE FOR FOLDING-TOP CONVERTIBLES

BACKGROUND OF THE INVENTION

1. Field of the Invention

The present invention relates to a folding top for vehicles having a front top component, which rests on a part of the body when the top is closed, is mounted pivotably on another top component and can be pivoted up about the bearing axis when opened, and having an automatic facility for pivoting the front top component by means of a spring energy store, which is stressed (regenerated) as the top is pivoted down and released as the top is pivoted up.

2. Background Information

When operating a folding top, it is difficult to carry out the sequence of motion smoothly, especially in the final stage of the closing operation. Owing to unfavorable lever ratios in the roof linkage and to angle ratios in the pivoting mechanism which become less favorable just before the stretched rest position is reached, there is a tendency toward marked acceleration or even a "gap" in the kinematics of the top. In this situation, the sequence of motion is often performed with too much kinetic energy at this stage, with the result that the roof cover strikes the body frame in an almost uncontrolled manner. This problem exists both with manual and motor-assisted operation of the top. Although this tendency is counteracted by the stiffness of the top cover and the requirement to stretch and tauten it, it is not eliminated. In accordance with the generally accepted convention, the axis of the vehicle in the direction of travel is referred to as the X axis, the horizontal axis of the vehicle transverse to the direction of travel as the Y axis and the vertical axis of the vehicle transverse to the direction of travel as the Z axis.

Conversely, there are also difficulties with the sequence of motion in the first stage of the opening operation when opening the folding top. The top linkage is in a kind of dead-center position in its extended rest position. Since it is precisely at the beginning of the opening operation that the upward-pivoting movement and the backward movement of the top have to be superimposed, it is very difficult to control the action of forces and moments in such a way that a smooth sequence of motion can be achieved. In the case of manual actuation, there are particular difficulties associated with this first part of the movement until the resistance have been overcome and the linkage has been moved out of its dead-center position. When the opening operation is controlled or assisted by motor, it can be observed that the front top component slides on the body before the front top component is released by being pivoted up.

German Patent Document No. 41 21 226 purports to disclose a folding top of the type in the field of the invention in which a compression spring is arranged as a spring energy store in the rear roof frame below the hinge joint, between the front and the rear roof frames, the compression spring being arranged and supported in a piston and, at its free end, resting against a tappet which has, toward the front, a neck with a significant reduction in diameter relative to a rod-shaped portion, this rod passing through the front plate of the rear roof-frame part and resting against the rear front plate of the front roof-frame part. Because of the very restricted installation space conditions, this supporting arrangement, the length of which can be varied to a limited extent, is arranged below the pivot-bearing axis between the two roof-frame parts. This results in very short lever arms and very short lengths of motion for the force vector in the x direction and hence in the longitudinal direction of the spring. This necessitates a very stiff compression spring with an extremely high spring constant and has the effect that, in the rest position of the top, the tappet rests with very high pressures against the rear front plate of the front roof-frame part, said front plate lying opposite the spring arrangement, and pushes said part forward within the play tolerance of the pivot mounting. This results in the front top component being pivoted up accordingly, leading to leaks and poorer contact between the top and the body frame.

Any solution to the problem is subject to the particular difficulty that the installation space conditions in the folding top are extremely restricted and complex. The installation spaces available must be outside the pivoting range of the top linkage and must not be in the way when folding the top up. The installation spaces which are likewise still available are so unfavorably positioned relative to the linkage components relevant for the critical sequences of motion that it is extremely difficult to accommodate them structurally.

SUMMARY OF THE PRESENT INVENTION

A technical problem underlying the present invention is to retard the sequence of motion of the folding linkage in the final part of the closing operation and to assist the upward-pivoting drive input in the initial part of the opening operation and, for this purpose, to find a less expensive solution which allows existing installation spaces to be used. In the case of a folding top described in the field of the invention, this problem is solved by virtue of the fact that the front top component is connected by a cable to the spring energy store, which is fixed in relation to movement of the front top component (i.e., has a point which remains stationary in a relative sense when the front top component moves, e.g. a spring support), the cable being guided over at least one deflection element between the front top component and the spring energy store, or that the spring energy store is connected by a cable passed over the deflection element to a point which is arranged behind the deflection element in the x direction and above said element in the z direction and is fixed in relation to the movement of the front top component, the deflection element being secured on the front top component, or that the front top component is connected by a cable to a point which is fixed in relation to the movement of the front top component and a spring energy store is integrated into the cable between the front top component and the fixed point, the location of attachment of the cable at the fixed point being arranged behind the front top component in the x direction and above the location of attachment of the cable to the front top component in the z direction.

The two alternative solutions proposed first are the reverse of each other kinematically, while the third alternative corresponds to the first but without deflection. The alternatives correspond to a common general inventive idea.

By using a flexible cable to connect the front top component directly or indirectly to the spring energy store and guiding the cable over a deflection element, a technical problem underlying the present invention has been solved in a manner which enables the available installation spaces to be used, even at remote locations, without the need to provide expensive or restrictive structures for this purpose. An embodiment in which the deflection element located nearest to the front top component is arranged behind the location of attachment of the cable to the front top component in the x direction and above it in the z direction makes it possible to configure the lever-arm ratios in an effective manner both for the retardation of the last part of the motion during closure and for the purpose of assisting driving and acceleration in the first part of the motion when opening the top, as is also the case in the exemplary embodiment in which the deflection element is secured on the front top component and the point to which the spring energy store is connected by a cable, which point is fixed in relation to movement of the front top component, is arranged behind the deflection element in the x direction and above it in the z direction.

An embodiment in which the front top component is connected by a cable to a point fixed in relation to its movement and a spring energy store is integrated into the cable between the front top component and the fixed point has the advantage of a direct and inexpensive solution in cases in which there is sufficient installation space available in this area, if, in this embodiment too, the location of attachment of the cable to the fixed point is arranged behind the front top component in the x direction and above the location of attachment of the cable to the front top component in the z direction.

The point of intervention of the spring energy store can be determined in a simple manner through the arrangement of the cable attachment and guide points relative to one another and the selection of the cable length in relation to the distances between the points. The fact that this point of intervention, at which the retarding or accelerating effect of the spring energy store on the drive input to the top mechanism starts, can thus be freely determined in a simple and inexpensive manner means that the design of the spring with respect to the spring constant and spring travel can be matched in an advantageous manner to the required assistance for the main drive input of the intervention time. In this way, it is possible to make the top mechanism smooth and efficient.

The cable length can be made adjustable in a simple manner using a cable attachment in the form of a threaded-bolt cable tensioner. This is an extremely simple device for altering the cable length when required to compensate for the play which results from wear and fatigue of materials, without any major expense in terms of equipment, tools or time.

Sheathing the cable in plastic is a simple way of ensuring that, when the top is operated, the resulting longitudinal movement of the cable does not cause damage to the components against which the cable is resting. The cable sheathing is also an advantageous way of ensuring gentle and precise guidance of the cable on the deflection element.

In the embodiments in which a tension spring is used as the spring energy store, the spring tension advantageously counteracts the play in the joints of the linkage, with the result that leakage is continuously counteracted in an advantageous manner.

The present invention thus provides a folding top for vehicles having a front top component, which rests on a part of the body when the top is closed, is mounted pivotably on another top component and can be pivoted up about the bearing axis when opened, and having an automatic facility for pivoting the front top component using a spring energy store, which is stressed (regenerated) as the top is pivoted down and released as the top is pivoted up, wherein the spring energy store (4) is arranged in an installation space remote from the hinge joint between the front and rear top components, and the front top component (2) is connected by a cable (7) to the spring energy store (4), which is fixed in relation to movement of said component, the cable (7) being guided over at least one deflection element (3) between the front top component (2) and the spring energy store (4), the deflection element (3) located nearest to the front top component (2) being arranged behind the front top component (2) in the x direction and above the location of attachment (6) of the cable (7) to the front top component (2) in the z direction.

Also provided is a folding top for vehicles having a front top component, which rests on a part of the body when the top is closed, is mounted pivotably on another top component and can be pivoted up about the bearing axis when opened, and having an automatic facility for pivoting the front top component using a spring energy store, which is stressed (regenerated) as the top is pivoted down and released as the top is pivoted up, wherein the spring energy store (4) is connected by a cable (7) passed over the deflection element (3) to a point which is arranged behind the deflection element (3) in the x direction and above said element in the z direction and is fixed in relation to the front top component (2), the deflection element (3) being secured on the front top component (2).

BRIEF DESCRIPTION OF THE DRAWINGS

The advantages described and further advantages of the solution proposed will be explained clearly in the description of exemplary embodiments, which are illustrated in the enclosed drawings in which.

DETAILED DESCRIPTION

Figure 1:
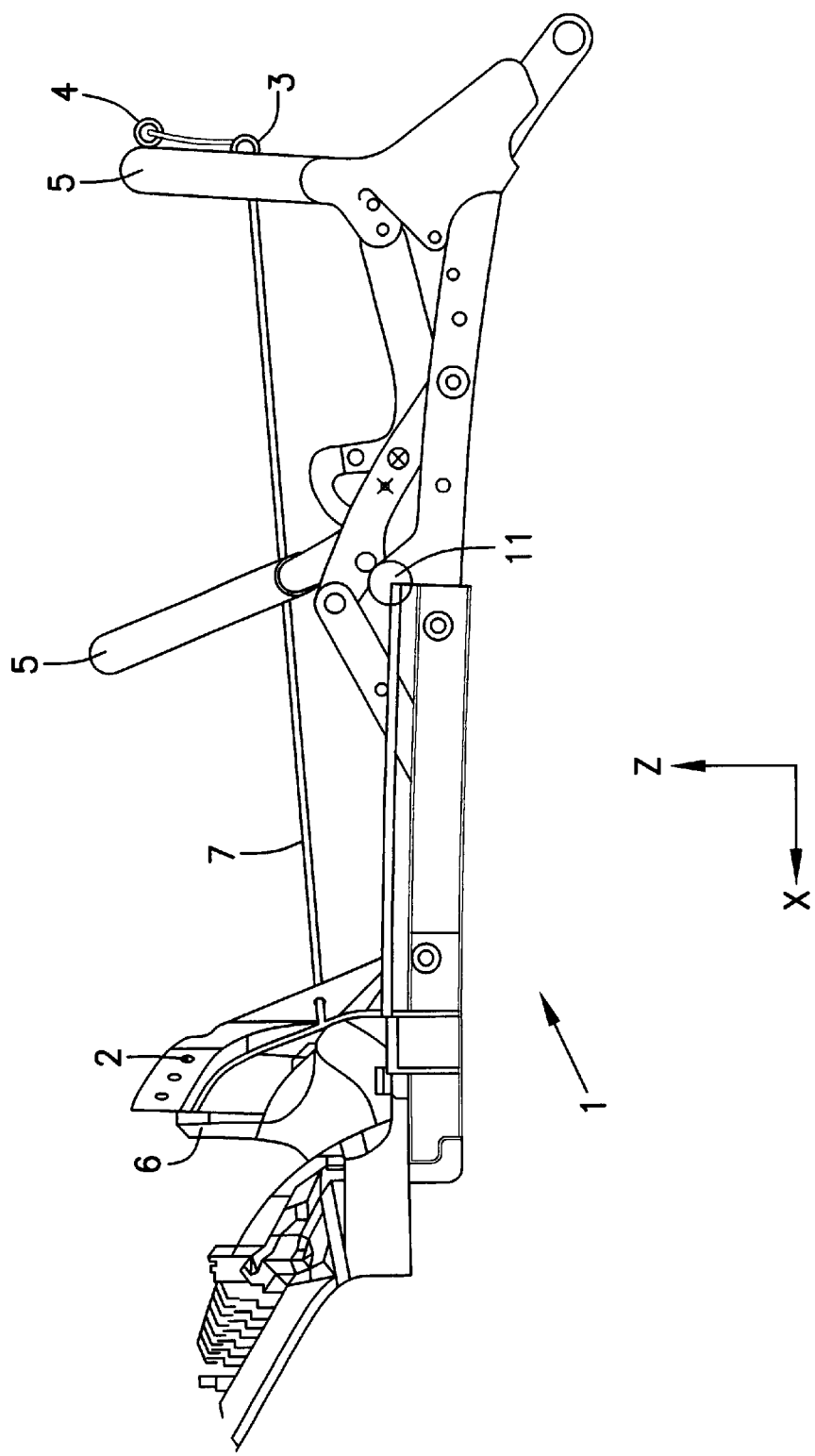
FIG. 1 shows a top linkage in the closed position of the top, in simplified perspective representation.
Figure 2:
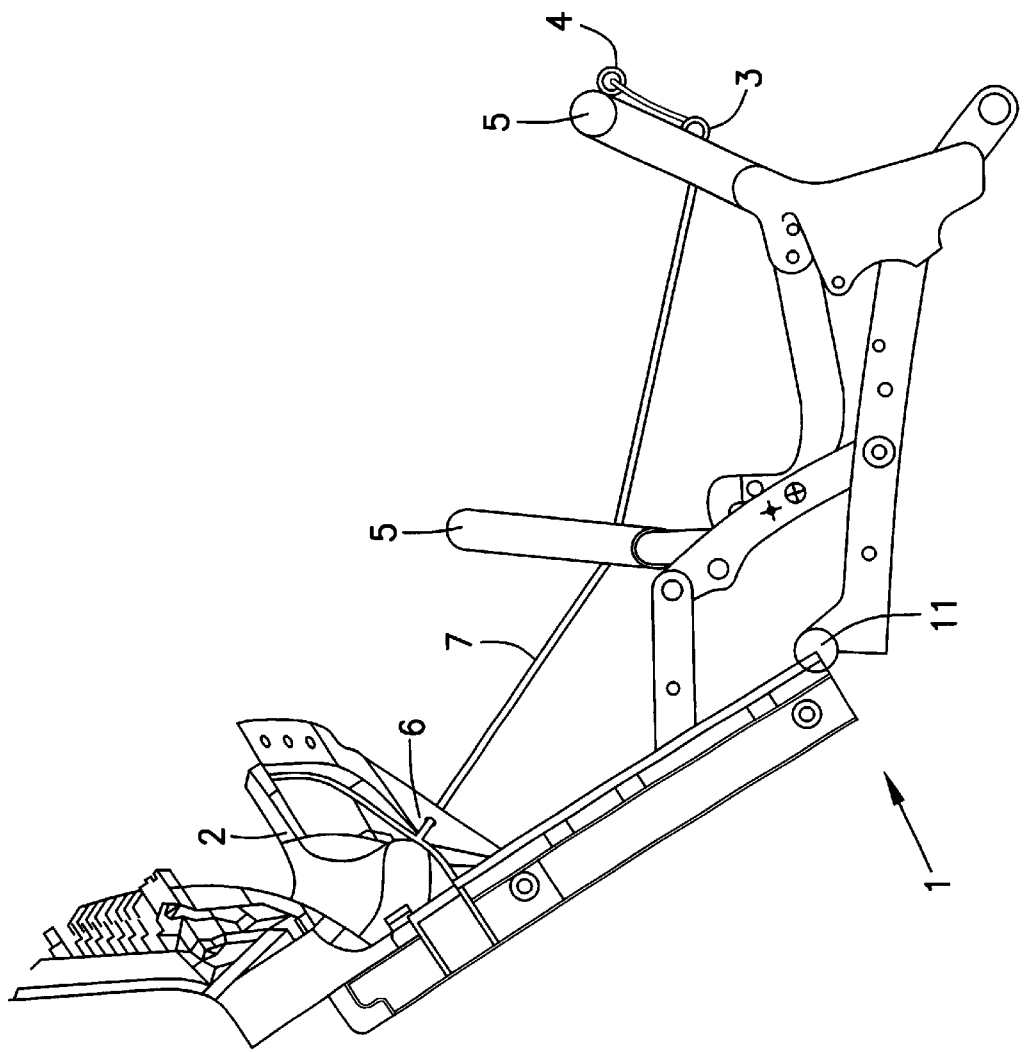
FIG. 2 shows the top linkage in the partially open position of the top, in simplified perspective representation.

FIG. 1 shows a top linkage with a bearing axis 11 in the closed position of the top in a simplified perspective representation, the front top component 2 resting on a part of a vehicle body 10 in this exemplary embodiment being the front bow, which is connected by a cable 7, via a deflection element 3, to the spring energy store 4, which is fixed relative to movement of the front bow. The deflection element 3 and the spring energy store 4 are secured on a bow 5 arranged behind the front top component. The deflection element 3 is situated behind the location of attachment,i.e. attachment location, 6 of the cable 7 to the front top component in the x direction and above it in the z direction. In the exemplary embodiment illustrated, the spring energy store 4 is designed as a tension spring, which is arranged in the installation space of the bow 5 arranged behind the front bow. However, the spring energy store may also be arranged at any other point at which there is a suitable installation space. In FIG. 2, the top linkage 1 shown in FIG. 1 is shown in the partially opened position of the top.

FIG. 1 shows a top linkage in the closed position of the top in a simplified perspective representation, the front top component 2 in this exemplary embodiment being the front bow, which is connected by a cable 7, via a deflection element 3, to the spring energy store 4, which is fixed relative to movement of the front bow. The deflection element 3 and the spring energy store 4 are secured on a bow 5 arranged behind the front top component. The deflection element 3 is situated behind the location of attachment 6 of the cable 7 to the front top component in the x direction and above it in the z direction. In the exemplary embodiment illustrated, the spring energy store 4 is designed as a tension spring, which is arranged in the installation space of the bow 5 arranged behind the front bow. However, the spring energy store may also be arranged at any other point at which there is a suitable installation space. In FIG. 2, the top linkage 1 shown in FIG. 1 is shown in the partially opened position of the top.

Figure 3:
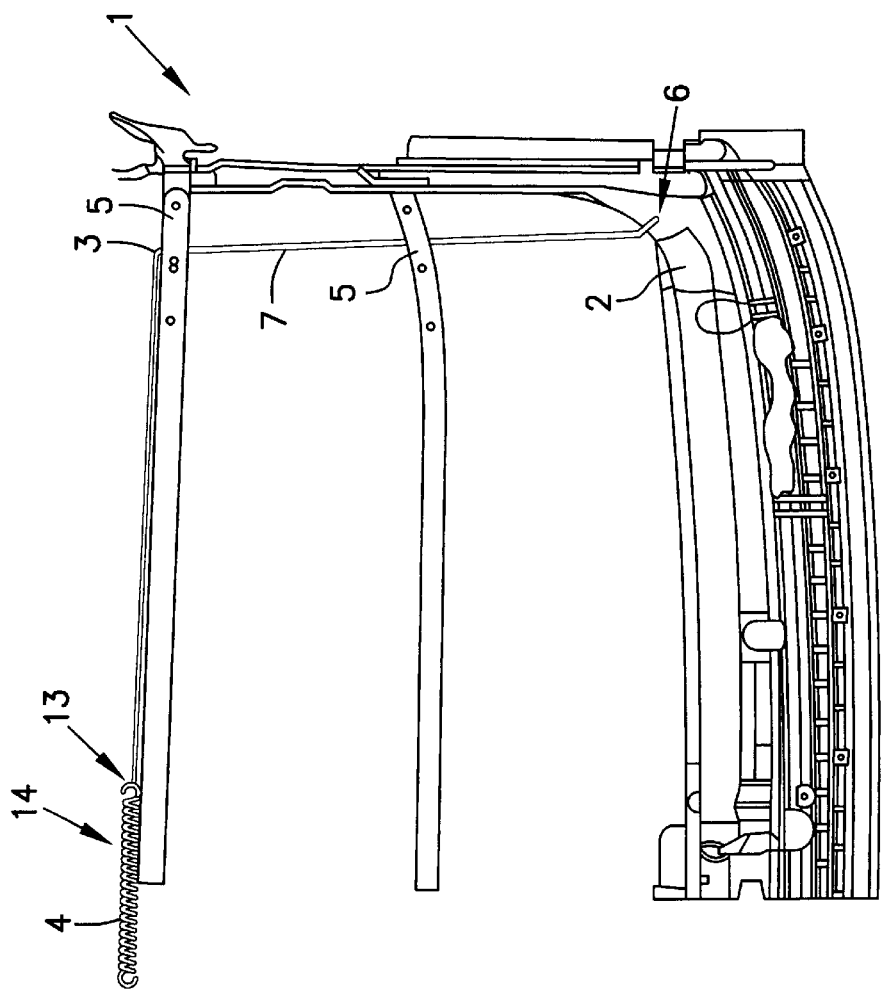
FIG. 3 shows the top linkage from FIG. 1 in plan view.

In FIG. 3, the top linkage shown in FIG. 1 is shown in a simplified plan view. In this view, the top linkage 1 is in the closed position of the top. The cable 7 runs in a straight line from the location of attachment 6 of the cable to the front top component 2 to the deflection element 3 and from there to the tension spring 4 at a cable attachment location 13, the spring 4 being tensioned (stressed) owing to the fact that the top is in the closed position. The cable attachment location 13 moves to a second attachment location 14 when the spring 4 is unstressed.

Figure 4:
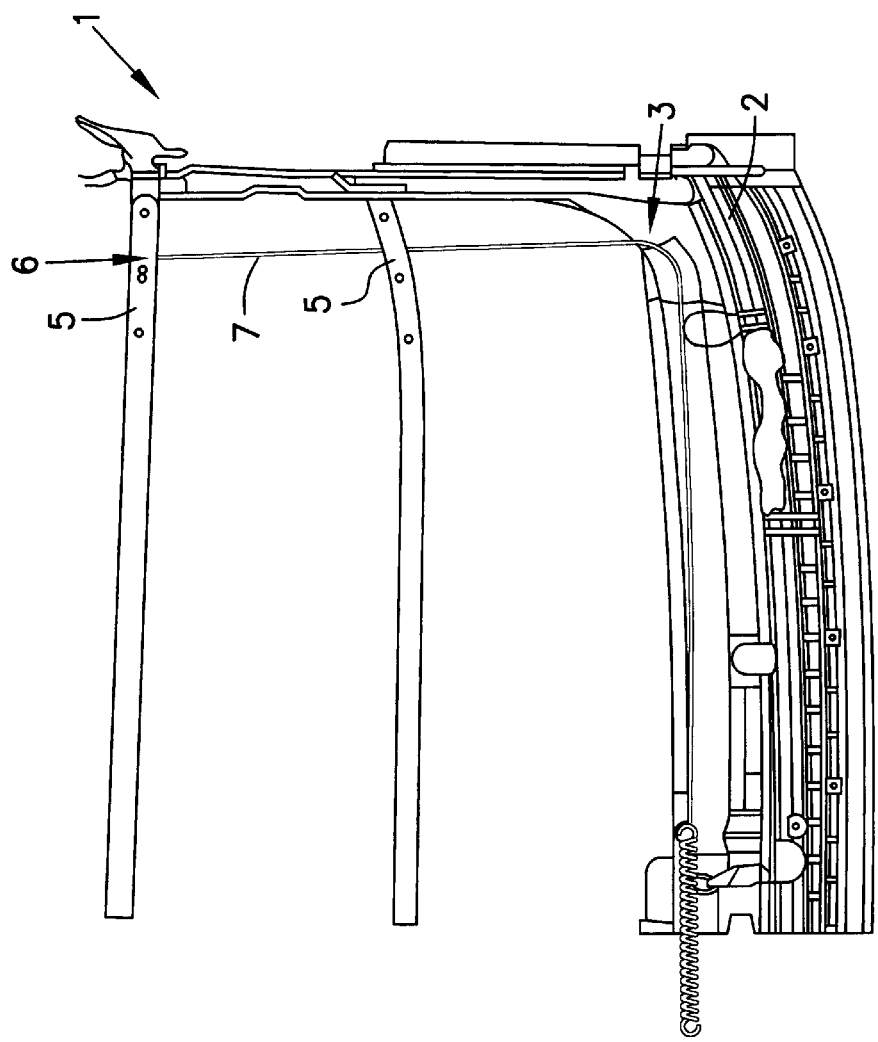
FIG. 4 shows a plan view, similar to that in FIG. 3, of another embodiment.

FIG. 4 shows another exemplary embodiment in a plan view similar to that in FIG. 3. In this embodiment, the cable 7 is attached at a point 6 fixed in relation to movement of the front top component 2 and, from there, is passed via a deflection element 3 secured on the front top component 2 to the spring energy store 4 designed as a tension spring. The spring energy store 4 is arranged in the installation space on the front top component 2 and is tensioned in the position illustrated since the top linkage is shown in the closed position. If the location of cable attachment 6 to the bow 5 is behind the deflection element 3 in the x direction and above the deflection element 3 in the z direction, the tension of the spring energy store assists an opening movement of the front top component. The illustrations in FIG. 3 and FIG. 4 illustrate clearly that a free choice of intervention point is possible using the locations of cable attachment and of the deflection element relative to one another and the choice of cable length in relation to these locations. The point of intervention represents that point in the sequence of motion of the linkage at which the retarding effect of the spring energy store on the sequence of motion begins when the top is being closed and the point up to which the assisting action of the spring energy store is effective when the top is being opened. The freedom available in the adaptation of the location of the spring energy store to the free installation spaces available makes it possible, by exploiting differences in the change in length of the spring energy store 4, to select springs with almost any spring characteristic so as to be able to match them precisely to the required degree of influence on the sequence of motion. It will also be easily appreciated from the drawing that compression springs or torsion springs can be used with the same effect instead of the tension springs shown here.

The illustrations in FIG. 1 also make it possible to appreciate clearly a third, alternative embodiment, in which the deflection element 3 is placed at this fixed point relative to the movement of front top component 2, e.g. through the cable attachment. The spring energy store is then integrated into the cable 7 between the location of attachment 6 and the location of attachment to the rear bow 5, making it possible to omit the deflection element 3 and the fixing of the spring energy store in the installation space of the bow 5. In cases in which the installation space conditions permit such an arrangement, this alternative embodiment is of equivalent effect but very much less expensive.

What is claimed is:

1. A folding top in combination with a vehicle having a vehicle body with an x direction and a z direction, comprising:

a front top component for resting on a part of the vehicle body when the folding top is in a closed position;

another top component, the front top component being pivotable with respect to the other top component, the front top component being pivotable upwardly about a bearing axis when being opened; and a spring energy store for pivoting the front top component, the spring energy store being stressed as the front top component is pivoted downwardly and released as the front top component is pivoted upwardly, the spring energy store being arranged in an installation space remote from the bearing axis of the front top component;

the front top component being connected by a cable to the spring energy store, the cable being connected to the front top component at an attachment location, the spring energy store being fixed in relation to movement of the front top component, the cable being guided over at least one deflection element between the front top component and the spring energy store, the at least one deflection element located nearest to the front top component being arranged behind the front top component in the x direction and above the attachment location in the z direction.

2. The folding top as claimed in claim 1 wherein an intervention of the spring energy store is determined by how much shorter the cable is compared to a distance between the attachment location in the opened position, via the at least one deflection element, and a second attachment location of the cable, the second attachment location being at a connection of the cable to the spring energy store when unstressed.

3. The folding top as claimed in claim 1 wherein the length of the cable is adjustable.

4. The folding top as claimed in claim 1 wherein the cable is sheathed in plastic.

5. The folding top as claimed in claim 1 wherein the spring energy store is a spring of variable length disposed parallel to the other top component.

6. The folding top as claimed in claim 1 wherein the spring energy store is at least one of a tension spring, compression spring and a torsion spring.

7. The folding top as claimed in claim 1 wherein the spring energy store is arranged on the other top component, the other top component being behind the front top component.

8. The folding top as claimed in claim 1 wherein the front top component and the other top component are bows.

9. A folding top for vehicles having a vehicle body having an x direction and a y direction, the folding top comprising:

a front top component for resting on a part of the vehicle body when the folding top is in a closed position;

another top component, the front top component being mounted pivotably on the other top component and pivotable upwardly about a bearing axis when being opened; and a spring energy store of an automatic facility for pivoting the front top component, the spring energy store being stressed as the top is pivoted downwardly and released as the top is pivoted upwardly, the spring energy store being connected by a cable passed over a deflection element to a point arranged behind the deflection element in the x direction and above the deflection element in the z direction, the point being fixed in relation to a movement of the front top component, the deflection element being secured on the front top component.

10. The folding top as claimed in claim 9 wherein an intervention of the spring energy store is determined by how much shorter the cable is than a distance between the point in the opened position, via the deflection element, and a location of attachment of the cable to the spring energy store when unstressed.

11. The folding top as claimed in claim 9 wherein a length of the cable is adjustable.

12. The folding top as claimed in claim 9 wherein the cable is sheathed in plastic.

13. The folding top as claimed in claim 9 wherein the spring energy store is a spring of variable length fixed parallel to the front top component.

14. The folding top as claimed in claim 9 wherein the spring energy store is a torsion spring.

15. The folding top as claimed in claim 9 wherein the spring energy store is arranged in an installation space of the front top component and is fixed on the front top component.

16. The folding top as claimed in claim 9 wherein the front top component includes a bow.

17. A method for folding a convertible top comprising the steps of:

placing a front top component against a vehicle body so as to close the convertible top;

pivoting the front top component with respect to another top component, the front top component being pivotable upwardly about a bearing axis when being opened; and stressing a spring energy store for pivoting the front top component as the front top component is pivoted downwardly and releasing the spring energy store as the front top component is pivoted upwardly, the spring energy store being arranged in an installation space remote from the bearing axis of the front top component and the front top component being connected by a cable to the spring energy store, the cable being connected to the front top component at an attachment location, the spring energy store being fixed in relation to movement of the front top component, the cable being guided over at least one deflection element between the front top component and the spring energy store, the at least one deflection element located nearest to the front top component being arranged behind the front top component in an x direction and above the attachment location in a z direction.

* * * * *